(12) United States Patent
Zhu et al.

(10) Patent No.: US 7,755,215 B2
(45) Date of Patent: Jul. 13, 2010

(54) METHOD AND CIRCUIT TO OUTPUT ADAPTIVE DRIVE VOLTAGES WITHIN INFORMATION HANDLING SYSTEMS

(75) Inventors: Guangyong Zhu, Austin, TX (US); John J. Breen, Harker Heights, TX (US); Shiguo Luo, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 86 days.

(21) Appl. No.: 11/741,202

(22) Filed: Apr. 27, 2007

(65) Prior Publication Data

US 2008/0265683 A1  Oct. 30, 2008

(51) Int. Cl.
*H02J 1/00* (2006.01)
*H02J 9/04* (2006.01)

(52) U.S. Cl. ............... 307/52; 307/59; 307/80; 307/82; 307/85; 307/86

(58) Field of Classification Search ............. 307/52, 307/59, 80, 82, 85–86
See application file for complete search history.

(56) References Cited

U.S. PATENT DOCUMENTS

| | | | | |
|---|---|---|---|---|
| 4,241,372 A * | 12/1980 | Sears | | 361/72 |
| 4,638,175 A * | 1/1987 | Bradford et al. | | 307/64 |
| 5,864,225 A * | 1/1999 | Bryson | | 323/268 |
| 6,067,241 A * | 5/2000 | Lu | | 363/65 |
| 6,130,813 A * | 10/2000 | Kates et al. | | 361/93.1 |
| 6,754,092 B2 * | 6/2004 | McDowell et al. | | 363/89 |
| 6,762,945 B2 * | 7/2004 | Morgen | | 363/17 |
| 7,057,310 B2 * | 6/2006 | Liu et al. | | 307/126 |
| 7,064,458 B2 * | 6/2006 | Wittner | | 307/65 |
| 7,304,464 B2 * | 12/2007 | Weng et al. | | 323/285 |
| 7,466,573 B2 * | 12/2008 | Kojori et al. | | 363/65 |
| 2003/0141763 A1 * | 7/2003 | Tracy et al. | | 307/60 |
| 2005/0213277 A1 * | 9/2005 | Vierling et al. | | 361/152 |
| 2006/0226821 A1 * | 10/2006 | Whittaker | | 323/282 |

OTHER PUBLICATIONS

U.S. Appl. No. 11/409,402, filed Apr. 21, 2006.

* cited by examiner

*Primary Examiner*—Stephen W Jackson
*Assistant Examiner*—Adi Amrany
(74) *Attorney, Agent, or Firm*—Larson Newman & Abel, LLP

(57) ABSTRACT

A method and circuit to output adaptive drive voltages within information handling systems is disclosed. According to one aspect of the disclosure, a method of outputting power within an information handling system can include sensing a load current of a power output stage operable to employ more than one drive voltage level. The method can also include comparing the load current to a threshold current setting, and selecting a first output drive voltage from a plurality of input drive voltages in response to comparing the load current to the threshold current setting. The method can also include coupling the first output drive voltage to the power output stage.

15 Claims, 5 Drawing Sheets

METHOD AND CIRCUIT TO OUTPUT ADAPTIVE DRIVE VOLTAGES WITHIN INFORMATION HANDLING SYSTEMS

FIELD OF THE DISCLOSURE

This disclosure relates generally to information handling systems, and more specifically, to a method and circuit to output adaptive drive voltages within information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
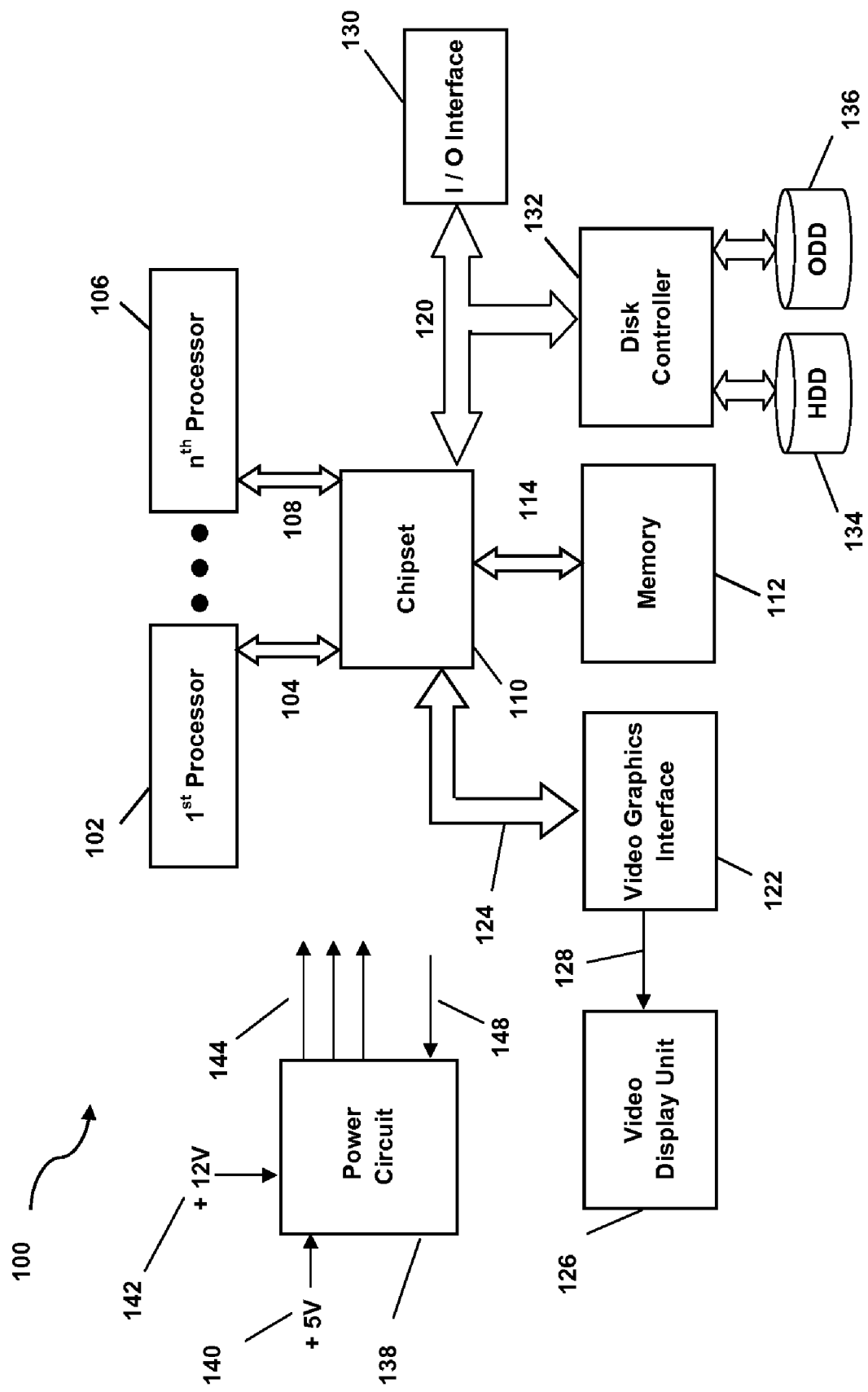
FIG. 1 illustrates a block diagram of an information handling system and power circuit according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

According to another aspect of the disclosure, a power circuit within an information handling system is disclosed. The power circuit can include a drive voltage selector operable to select at least one of a plurality of input voltage sources to output as a selected drive voltage. The power circuit can further include a threshold current detection circuit operable to sense a load current. The threshold current detection circuit can be operably coupled to the drive voltage selector. The power circuit can also include a power output stage coupled to the drive voltage selector and the threshold current detection circuit. The power output stage can be operable to couple the load current to the threshold current detection circuit. The power circuit can further include the selected drive voltage operable to be selected in response to comparing the load current to a threshold current setting.

According to another aspect of the disclosure, a method of outputting power within an information handling system can include sensing a load current of a power output stage operable to employ more than one drive voltage level. The method can also include comparing the load current to a threshold current setting, and selecting a first output drive voltage from a plurality of input drive voltages in response to comparing the load current to the threshold current setting. The method can also include coupling the first output drive voltage to the power output stage.

According to a further aspect of the disclosure, an information handling system is disclosed. The information handling system can include a drive voltage selector operable to select at least one of a plurality of input voltage sources to output as a selected drive voltage to a drive unit. In one form, the plurality of input sources can include a five (5) volt voltage input source coupled to the drive voltage selector, and a twelve (12) volt voltage input source coupled to the drive voltage selector. The information handling system can also include a threshold current detection circuit operable to sense a load current, the threshold current detection circuit operably coupled to the drive voltage selector. The information handling system can further include a power output stage coupled to the drive voltage selector and the threshold current detection circuit. In one form, the power output stage operable to couple the load current to the threshold current detection circuit. The selected drive voltage can be coupled to the drive unit, and the selected drive voltage can be selected in response to comparing the load current to a threshold current setting.

FIG. 1 illustrates a block diagram of an information handling system according to one aspect of the disclosure. FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include a dedicated bus to transfer data between first physical processor 102 and the $n^{th}$ physical processor 106. For example, the chipset 110 including a chipset that can include a memory controller hub and an input/output (I/O) controller hub. As a memory controller hub, the chipset 110 can function to access the first physical processor 102 using first bus 104 and the $n^{th}$ physical processor 106 using the second host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers between the buses 104, 108, and 114.

According to another aspect, the chipset 110 can include an application specific chipset that provides connectivity to various buses, and integrates other system functions. For example, the chipset 110 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, an Intel 975X chipset, an Intel G965 chipset, available from the Intel Corporation of Santa Clara, Calif., or any combination thereof, can provide at least a portion of the chipset 110. The chipset 110 can also be packaged as an application specific integrated circuit (ASIC).

In one form, the chipset 110 can be coupled to a video graphics interface 122 using a third bus 124. In one form, the video graphics interface 122 can be a Peripheral Component Interconnect (PCI) Express interface operable to provide content to display within a video display unit 126. Other graphics interfaces may also be used. The video graphics interface 122 can provide a video display output 128 to the video display unit 126. The video display unit 126 can include one or more types of video displays such as a flat panel display (FPD), cathode ray tube display (CRT) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a PCI bus or a high speed PCI-Express bus. In one embodiment, a PCI bus can be operated at approximately 66 MHz and a PCI-Express bus can be operated at more than one (1) speed (e.g. 2.5 GHz and 5 GHz). PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connected to an I/O interface 130 and one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

The information handling system 100 further includes an power circuit 138 operable to input a plurality of regulated power outputs 144 to various components within the information handling system 100. According to one aspect, the regulated power outputs 144 can be output by one or more power regulator of the power circuit 138 and can include, for example, 1.05 volts, 1.1 volts, 1.5 volts, 1.8 volts, 3.3 volts, 5.0 volts, or other voltage levels or outputs as desired, that can be used to power various components within the information handling system 100.

In one form, the adaptive power circuit 138 can access a first voltage source, such as a five (5) volt source 140, and a second voltage source, such as a twelve (12) volt source 142, and selectively couple one of the input voltage sources to a output power stage of the power circuit 138 operable to be used to produce the regulated power outputs 144. In one form, the five (5) volt source 140 can include a five (5) volt input power rail and the twelve (12) volt source 142 can include a twelve (12) volt input power rail. Other voltage rails, additional power sources, or any combination thereof, can be coupled to the power circuit 138 as desired to output the regulated power outputs 144.

In one form, as increases and decreases in power consumption of the regulated power outputs 144 occur, the power circuit 138 can detect changes in power demands of the information handling system 100 using a current load input 148. For example, during relatively low power consumption periods, the power circuit 138 can employ the five (5) volt source 140 as the driver voltage to drive power switches. Further, the power circuit 138 can detect an increase in power demands of the information handling system 100 by detecting a current load using current load input 148, and switch the driver voltage from using the five (5) volt source 140 to the twelve (12) volt source 142 to handle the increase in power demand. In this manner, the power circuit 138 can reduce the overall power consumption of the information handling system 100 during relative low power demand periods and increase available power during increased power demand periods.

Figure 2:
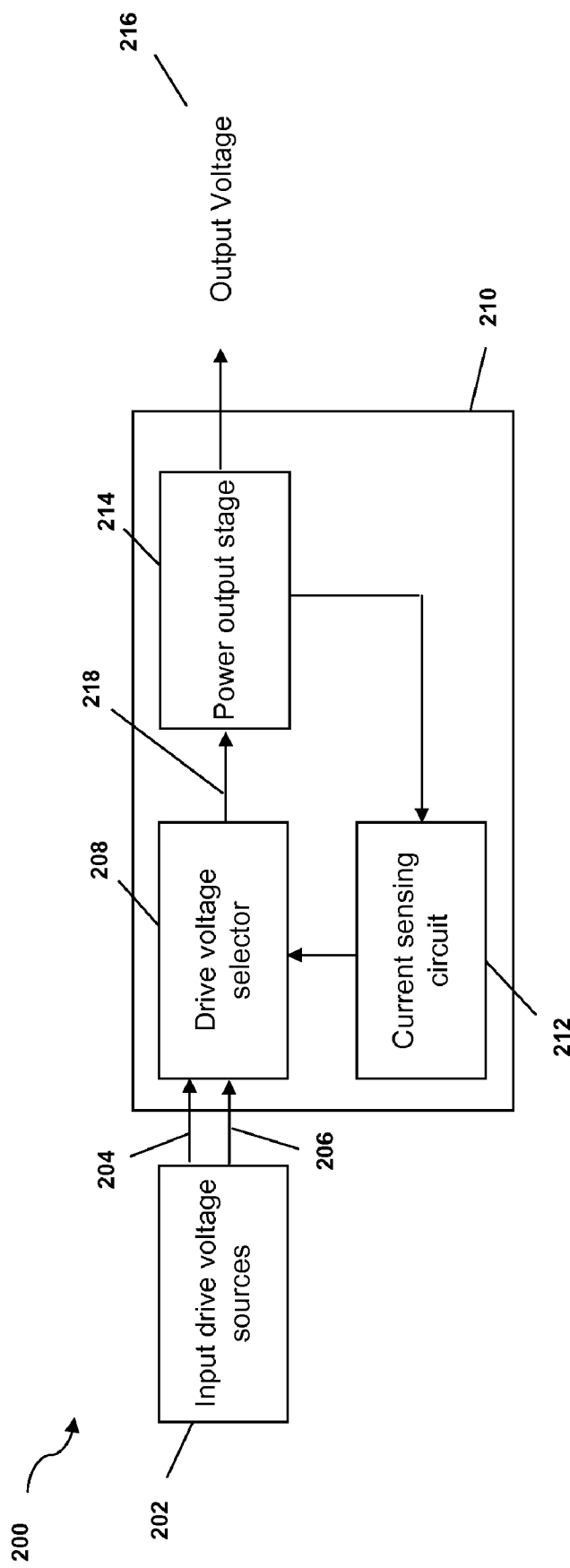
FIG. 2 illustrates a block diagram of a power circuit of an information handling system in accordance with one aspect of the disclosure.

FIG. 2 illustrates a block diagram of a power circuit of an information handling system in accordance with one aspect of the disclosure. The power circuit, illustrated generally at 200, can include input drive voltage sources 202 and in one form, the input drive voltage sources 202 can couple a first input voltage source 204, such as a five (5) volt source, and a second input voltage source 206, such as a twelve (12) volt source, to a drive voltage selector 208 of a regulator 210. In one form, a five (5) volt source and a twelve (12) volt source are used although, other voltage sources and levels operable to be used in association with the power circuit 200 can be employed.

The regulator 210 can also include a current sensing circuit 212 operable to receive a load current input from a power output stage 214 operable to output an output voltage 216 of the regulator 210. The power output stage 214 can receive a selected drive voltage 218 from the derive voltage selector 208 to be used to output the output voltage 216. The current sensing circuit 212 can also couple an input to the drive voltage selector 208. In one form, the power output stage 214 can be provided external to the regulator 210 as desired. In other forms, a drive unit can be used to couple the selected drive voltage 218 to the power output stage 214. Additionally, portions or all of the current sensing circuit 212 can be provided external to the regulator 210.

During operation, the power circuit 200 can detect changes in power requirements by detecting a load current using the current sensing circuit 212 coupled to the power output stage 214. For example, during periods of relatively low power use, the current sensing circuit 212 can sense a load current at the power output stage 214, and compare the load current to a threshold current setting. In one form, if the load current is less than the threshold current setting, the current sensing circuit 212 can couple an input to the drive voltage selector 208 to select a lower input voltage from input voltage sources 202. In another form, if the load current is greater than the threshold current setting, the current sensing circuit 212 can couple an input to the drive voltage selector 208 to select a higher input voltage source from the input voltage sources 202. In this manner, power consumption of the power circuit 200 can be maintained at a minimum level in response to power demands.

Figure 3:
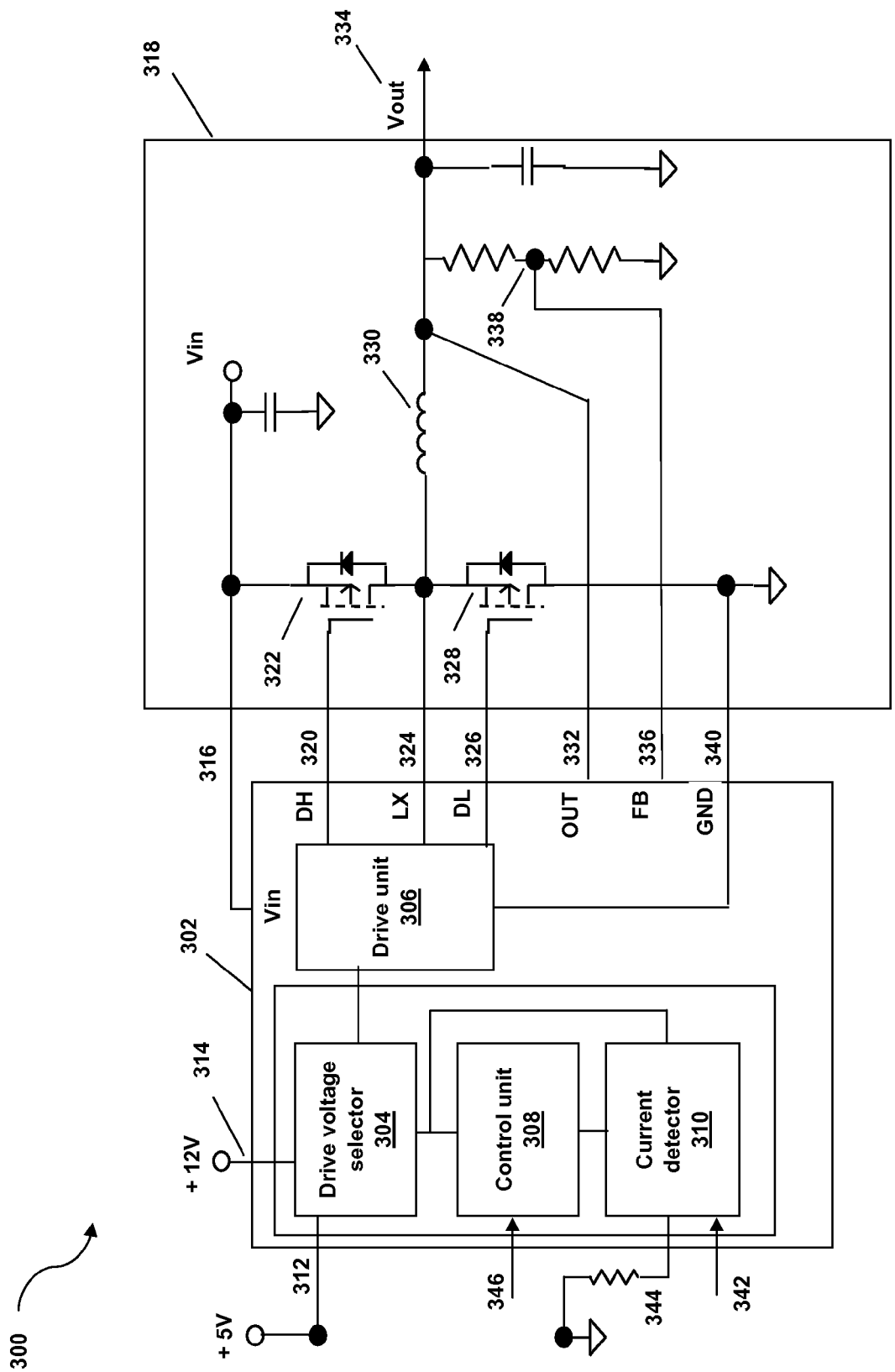
FIG. 3 illustrates a schematic diagram of a power circuit in accordance with one aspect of the disclosure.

FIG. 3 illustrates a schematic diagram of a power circuit in accordance with one aspect of the disclosure. The power circuit, illustrated generally at 300, can include a regulator controller 302 including a drive voltage selector 304, a drive unit 306, a control unit 308, and a threshold current detector 310. The drive voltage selector 304 can be coupled to a five (5) volt input voltage source 312, such as a five (5) volt voltage rail of an information handling system. The drive voltage selector 304 can further be coupled to a twelve (12) volt input voltage source 314, such as a twelve (12) volt voltage rail of an information handling system. Voltage rails are commonly used within information handling systems as power sources that can be coupled to various devices, components, circuit boards, power circuits, or any combination thereof.

According to one aspect, the regulator controller 302 can also include an input voltage terminal 316 of an output power stage 318 operable to couple input power to the regulator controller 302 to power the regulator controller 302. The regulator controller 302 can also includes a high-side voltage output terminal (DH) 320 coupled to a first driver or high-side control switch 322. A switching node terminal (LX) 324 can be operated as a switching node and coupled between a low-side voltage output terminal (DL) 326 operably coupled to a low-side control switch 328 and the high-side control switch 322. In one form, the high-side control switch 322 and the low-side control switch 328 can include Metal Oxide Field Effect Transistors (MOSFETs) or other types of transistors operable as drive transistors driven by a drive voltage output by the regulator controller 302. The switching node terminal (LX) 324 can also be coupled to an inductor element 330 coupled to output voltage sensing terminal 332 of the regulator controller 302. According to one aspect, the regulator controller 302 and power output stage 318 can be configured as a synchronous buck regulator. Other types of regulator circuits, or combinations thereof, can also be employed as desired.

In one form, the output power stage 318 can also include an output voltage terminal 334 operable to output a voltage level, and a feedback voltage divider 338 coupled to a feedback terminal 336 of the regulator controller 302. The regulator controller 302 can also include a current sensing input 342 operably associated with a current threshold setting component 344 that can include one or more resistive elements, a capacitive elements, or any combination thereof.

During operation, the current sensing input 342 can receive an analog input that can be compared to an input from the threshold current setting component 344 using the current detector 310. If an increase in a current level is detected, the current detector 310 can output a logical high, or other value, to alter or increase the drive voltage output by the drive voltage selector 304. Similarly, if a decrease in a current level is detected as being less than the value established by the threshold current setting component 344, the current detector 310 can output a logical low, or other value, to alter or reduce the drive voltage output by the drive voltage selector 304.

For example, the drive voltage selector 304 can select the five (5) volt input voltage source 312 as an input voltage and couple the five (5) volt input voltage source 312 to the drive unit 306. The drive unit 306 can couple the five (5) volt input voltage to the high-side voltage output terminal 320 to drive the high-side control switch 322. Additionally, the drive unit 306 can couple the five (5) volt input voltage to the low-side voltage output terminal 326 to drive the low-side control switch 328. As the voltage output 334 is output as a regulated output voltage, changes in the current load of the voltage output 334 can be detected by the current detector 310 and altered as desired.

In one form, the control unit 308 can include a control input 346 such as a digital control input that can be coupled to a circuit, controller, processor, etc. that can be used to couple a control input 346 to alter an output voltage level coupled to the drive unit 306. For example, a system controller (not illustrated) can monitor power states within an information handling system and can couple a logical high or low input to the control unit 308 to alter selection of a drive voltage output by the drive voltage selector 304. As such, the power circuit 300 can employ a digital input, analog input, or any combination thereof, to alter drive voltage selection to drive an output stage of the power circuit 300.

Figure 4:
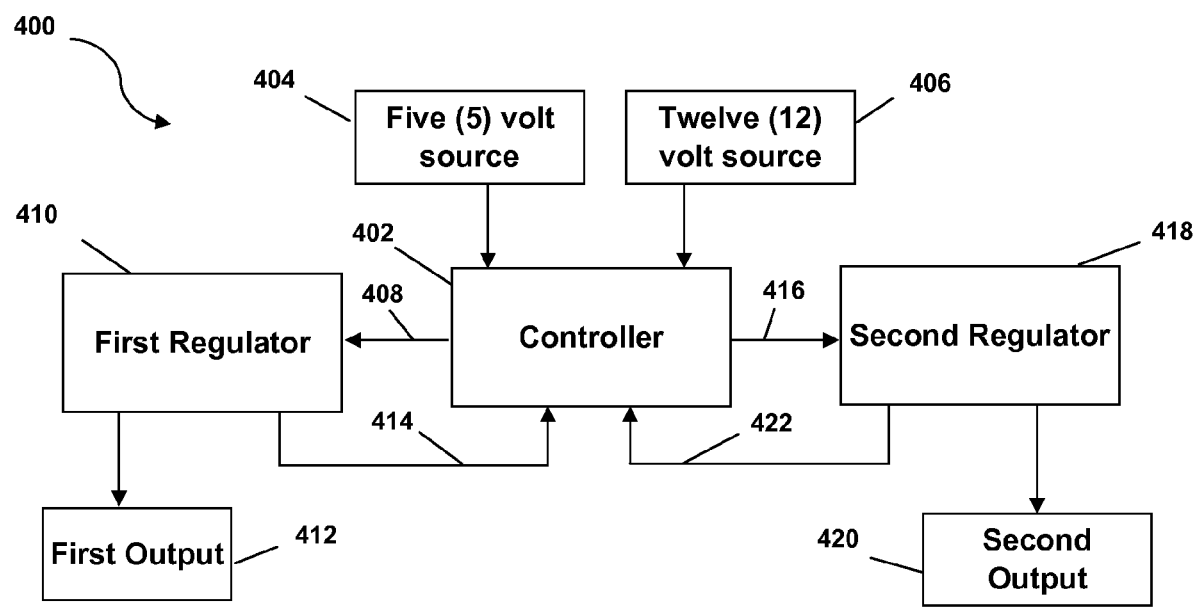
FIG. 4 illustrates a block diagram of a power circuit incorporating multiple regulators in accordance with one aspect of the disclosure.

FIG. 4 illustrates a block diagram of a multiple regulator power circuit in accordance with one aspect of the disclosure. A multiple regulator power circuit, illustrated generally at 400, can be used within an information handling system such as the information handling system 100 illustrated in FIG. 1, or any other type of information handling system that can employ portions, or all, of the multiple regulator power circuit 400. The multiple regulator power circuit 400 can include portions or all of the power circuit 200 of FIG. 2, the power circuit 300 of FIG. 3, or any combination thereof.

The multiple regulator power circuit 400 can include a controller 402 coupled to a five (5) volt power source 404 and a twelve (12) volt power source 406. Other voltage levels may also be employed. The controller 402 can include a programmable device operable to be programmed with logic that can be used to control voltage outputs of the controller 402 based on one or more threshold levels. The controller 402 can output a first drive voltage 408 to a first regulator 410 operable to output a first output voltage level 412 such as an output voltage rail. The first regulator 410 can couple a first current load input 414 to the controller 402. The controller 402 can also output a second drive voltage 416 to a second regulator 418 operable to output a second output voltage level 420. The second regulator 418 can also include a second current load input 422 coupled to the controller 402.

During operation, the controller 402 can couple the five (5) volt source 404 to the first regulator 410, and the first regulator 410 can output the first output voltage level 412 at a first level, such as 1.5 volts, or some other value. Additionally, the controller 402 can also couple the five (5) volt source 404 to the second regulator 418, and the second regulator 418 can output the second output voltage level 420 at a second level, such as 1.8 volts, or some other value. During use of the first output voltage level 412, the first regulator 410 can couple the first current load input 414 to the controller 402. During use of the second output voltage level 420, the second regulator 418 can couple the second current load input 422 to the controller 402. If the first current load input 414 increases to or above a threshold current level, the controller 402 can alter the first drive voltage 408 from the five (5) volt power source 404 to the twelve (12) volt power source 406. Additionally, the second regulator 418 can maintain using the five (5) volt power source 406 if the second current load input 422 is maintained below a threshold current level. Similarly, as the first current load input 414 decreases to below a threshold current level, the controller 402 can use the five (5) volt power source 404 as the first drive input 408 to the first regulator 410.

In one form, separate threshold current levels or settings can be used in association with each regulator 410 and 418. For example, the first regulator 410 can include a first associated threshold current level, and the second regulator 418 can include a second threshold current level that can be different from the first threshold current level. Each threshold current level setting can be set internal or external to the controller 402. In this manner, the first regulator 410 can use multiple drive voltages to provide the first output voltage level 412, and the second regulator 418 can use multiple drive voltages to output the second output voltage level 420 as desired.

Figure 5:
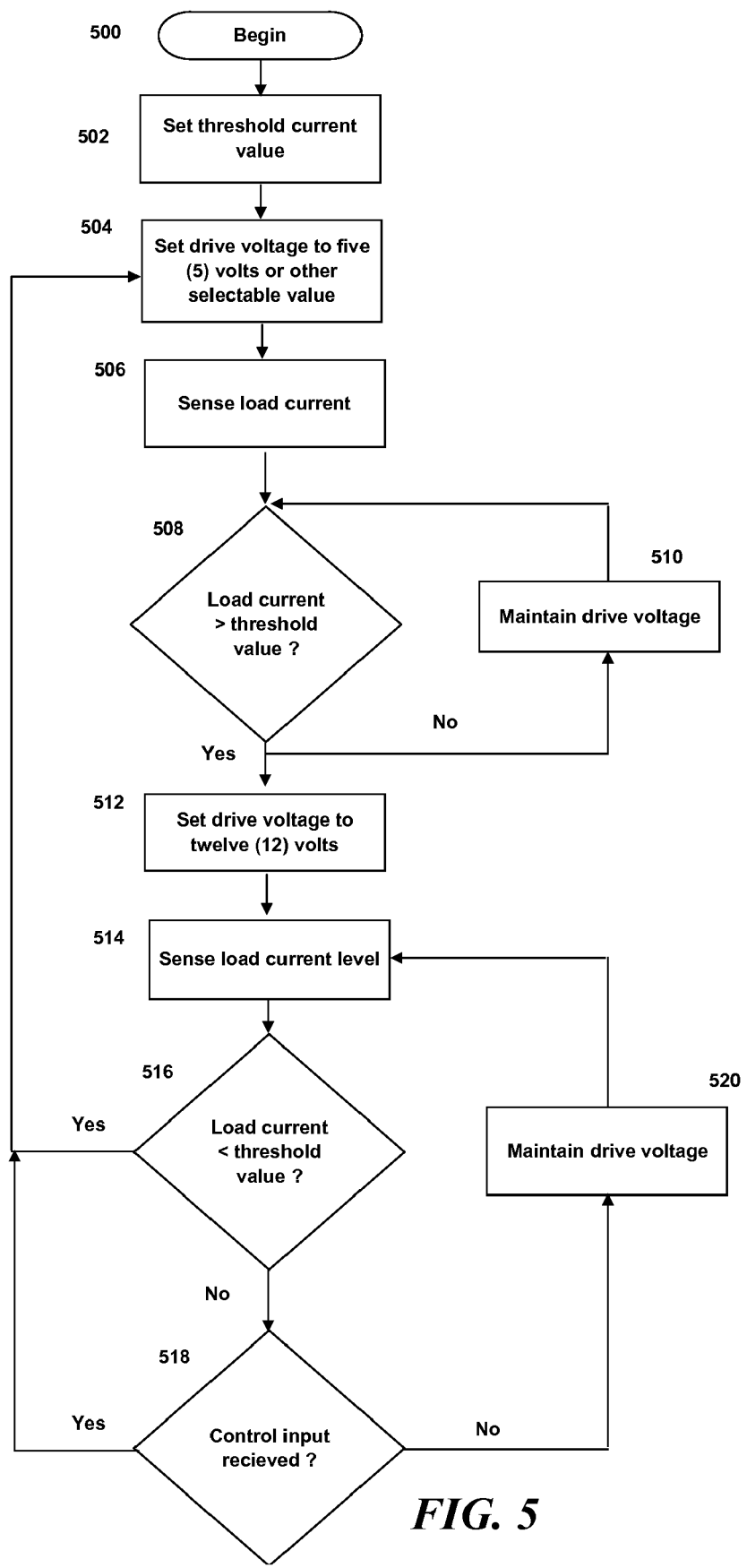
FIG. 5 illustrates a flow diagram of a method of outputting power according to one aspect of the disclosure.

FIG. 5 illustrates a flow diagram of a method of outputting power according to one aspect of the disclosure. The method begins generally at block 500. At block 502, a threshold current value for a load current can be set. For example, a threshold current value of eleven (11) amps can be set. Other values such as six (6) amps, seven (7) amps, twelve (12) amps, etc. can also be used as desired. Upon establishing a threshold current value, the method can proceed to block 504 and a drive voltage can be set to five (5) volts. For example, a five (5) volt voltage source can be coupled to a drive unit and used to output a drive voltage to a drive circuit. The method can then proceed to block 506, and a load current can be sensed. For example, an output power stage can output a load current in response to power demands of an associated power distribution circuit.

The method can proceed to decision block 508, and the load current can be compared to the current threshold value. For example, if the load current is less than the threshold current value (e.g. sensed current is eight (8) amps, threshold value is (11) amps), the method can proceed to block 510 and the output drive voltage can be maintained. If at decision block 508, the load current is greater than the threshold current value, the method can proceed to block 512 and the drive voltage can be set to twelve (12) volts. The method can then proceed to block 514 and the load current can be sensed at the power output stage. The method can then proceed to decision block 516, and if the load current is less than the threshold current value, the method can proceed to block 504, and the drive voltage can be set to five (5) volts or another selectable voltage level. If at decision block 516, the load current is greater than the threshold current value, the method can proceed to decision block 518, and determines if a control input has been received to alter the drive voltage. If at decision block 518, a control input has not been received, the method can proceed to block 520 and the output drive voltage can be maintained (e.g. set to twelve (12) volts or some other selected value). The method can then proceed to block 514 and repeat as desired. If at decision block 518, a control input has been received, the method can proceed to block 504 and alters the drive voltage value.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A power circuit within an information handling system, the power circuit comprising:
    a drive voltage selector operable to select at least one of a plurality of input voltage sources to output as a first selected drive voltage, wherein the plurality of input voltage sources comprises:
        a first power rail at a first voltage level; and
        a second power rail at a second voltage level maintained at a higher voltage level than the first voltage level;
    a first threshold current detection circuit operable to sense a first load current, the first threshold current detection circuit operably coupled to the drive voltage selector;
    a first power output stage coupled to the drive voltage selector and the first threshold current detection circuit, the first power output stage operable to:
        regulate the first selected drive voltage to provide a first regulated voltage at a third voltage level maintained at a different voltage level from the first and second voltage levels, the first regulated voltage being operable to drive the first load current; and
        couple the first load current to the first threshold current detection circuit; and
    wherein the first selected drive voltage is selected in response to comparing the first load current to a first threshold current setting, such that:

when the first load current is lower than the first threshold current setting, the first power rail is selected; and
when the first load current is higher than the first threshold current setting, the second power rail is selected.

2. The power circuit of claim 1, wherein the drive voltage selector includes logic operable to:
select the first power rail when the first load current is lower than the first threshold current setting;
select the second power rail when the first load current is higher than the first threshold current setting; and
couple the selected input voltage source to a drive unit operable to output the first selected drive voltage to the first power output stage.

3. The power circuit of claim 1, wherein:
the drive voltage selector is further operable to select at least one of the plurality of input voltage sources to output as a second selected drive voltage;
the power circuit further comprising:
a second threshold current detection circuit operable to sense a second load current, the second threshold current detection circuit operably coupled to the drive voltage selector;
a second power output stage coupled to the drive voltage selector and the second threshold current detection circuit, the second power output stage operable to:
regulate the second selected drive voltage to provide a second regulated voltage at a fourth voltage level maintained at a different voltage level from the first, second, and third voltage levels, the second regulated voltage being operable to drive the second load current; and
couple the second load current to the second threshold current detection circuit; and
wherein the second selected drive voltage is selected in response to comparing the second load current to a second threshold current setting, such that:
when the second load current is lower than the second threshold current setting, the first power rail is selected; and
when the second load current is higher than the second threshold current setting, the second power rail is selected.

4. The power circuit of claim 1, further comprising a regulator controller including the drive voltage selector and the first threshold current detection circuit.

5. The power circuit of claim 4, wherein the regulator controller includes the first power output stage.

6. The power circuit of claim 1, wherein the first power output stage comprises a synchronous buck voltage regulator.

7. The power circuit of claim 1, wherein the first power rail comprises a five (5) volt voltage rail.

8. The power circuit of claim 7, wherein the second power rail comprises a twelve (12) volt voltage rail.

9. A method of outputting power within an information handling system, the method comprising:
sensing a first load current of a power output stage operable to receive a first drive voltage;
comparing the first load current to a first threshold current setting;
in response to determining that the first load current is higher than the first threshold current setting:
selecting a first power rail from a plurality of power rails, the first power rail being maintained at a first voltage level; and
supplying the first power rail as the first drive voltage for the power output stage;
in response to determining that the first load current is lower than the first threshold current setting:
selecting a second power rail from the plurality of power rails, the second power rail being maintained at a second voltage level that is lower than the first voltage level; and
supplying the second power rail as the first drive voltage for the power output stage; and
regulating at the power output stage the first drive voltage to provide a first regulated voltage at a third voltage level different from the first and second voltage levels, the first regulated voltage being operable to drive the first load current.

10. The method of claim 9, further comprising:
sensing a second load current of the power output stage, wherein the power output stage is further operable to receive a second drive voltage;
comparing the second load current to a second threshold current setting;
in response to determining that the second load current is higher than the second threshold current setting:
selecting the first power rail; and
supplying the first power rail as the second drive voltage for the power output stage;
in response to determining that the second load current is lower than the second threshold current setting:
selecting the second power rail; and
supplying the second power rail as the second drive voltage for the power output stage; and
regulating at the power output stage the second drive voltage to provide a second regulated voltage at a fourth voltage level different from the first, the second, and the third voltage levels, the first regulated voltage being operable to drive the second load current.

11. The method of claim 9, wherein:
sensing the first load current includes coupling the first load current from a portion of the power output stage to a threshold current detection circuit;
the first threshold current setting is configured to enable selection of the first drive voltage relative to a power requirement;
the first power rail comprises a five (5) volt drive voltage; and
the second power rail comprises a twelve (12) volt drive voltage.

12. The method of claim 9, further comprising:
outputting the first drive voltage to the power output stage using a drive unit; and
outputting the second drive voltage to the power output stage using the drive unit.

13. An information handling system comprising:
a drive voltage selector operable to select at least one of a plurality of input voltage sources to output as a selected drive voltage to a drive unit, the plurality of input sources including:
a five (5) volt voltage input source coupled to the drive voltage selector; and
a twelve (12) volt voltage input source coupled to the drive voltage selector;
a threshold current detection circuit operable to sense a load current, the threshold current detection circuit operably coupled to the drive voltage selector;
a power output stage coupled to the drive voltage selector and the threshold current detection circuit, the power output stage operable to:
regulate the selected drive voltage to provide a first regulated voltage maintained at a third voltage level different than the five (5) and twelve (12) volt voltage input sources, the first regulated voltage being operable to drive the load current; and couple the load current to the threshold current detection circuit; and wherein the selected drive voltage coupled to the drive unit, the selected drive voltage is further selected in response to comparing the load current to a threshold current setting, such that when the load current is lower than the threshold current setting, the five (5) volt voltage input source is selected; and when the load current is higher than the threshold current setting, the twelve (12) volt voltage input source is selected.

14. The information handling system of claim 13, further comprising a regulator controller including the drive selector, the current sensing circuit, and the drive unit.

15. The information handling system of claim 14, wherein the regulator controller further includes logic operable to:

output the five (5) volt voltage input to the drive unit when the load current is lower than the threshold current setting; and output the twelve (12) volt voltage input to the drive unit when the load current is higher than the threshold current setting.

* * * * *